No. 861,335. PATENTED JULY 30, 1907.
J. VARLEY.
LOOM SHUTTLE.
APPLICATION FILED FEB. 9, 1907.
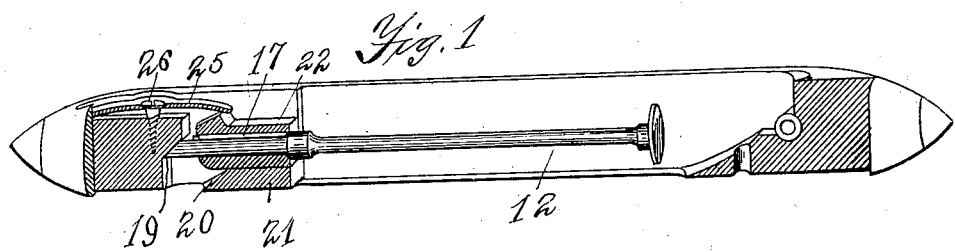
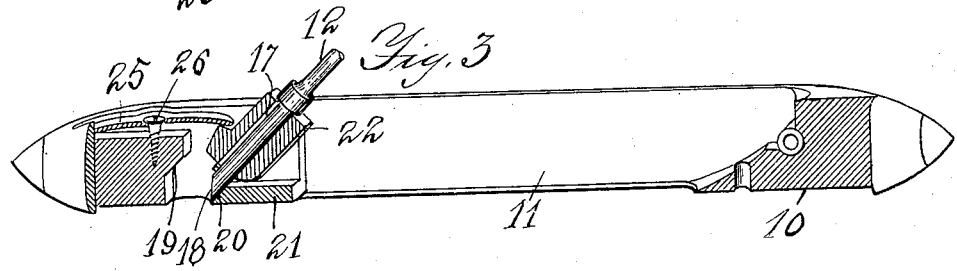
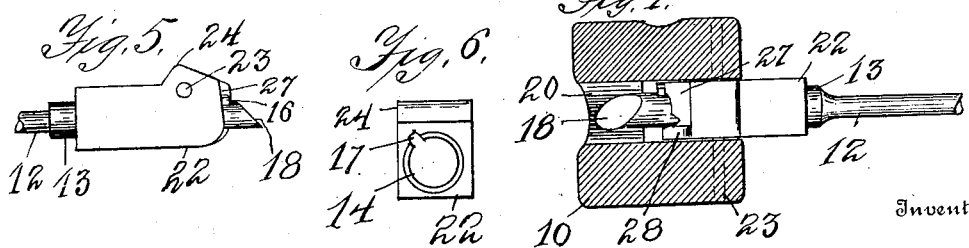
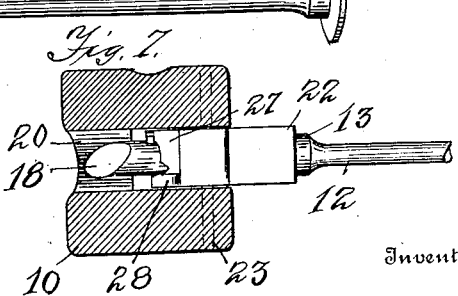
Witnesses
Inventor
John Varley
By S. Arthur Baldwin,
Attorney

UNITED STATES PATENT OFFICE.

JOHN VARLEY, OF JAMESTOWN, NEW YORK.

LOOM-SHUTTLE.

No. 861,335.     Specification of Letters Patent.     Patented July 30, 1907.

Application filed February 9, 1907. Serial No. 356,499.

*To all whom it may concern:*

Be it known that I, JOHN VARLEY, a citizen of the United States, residing at Jamestown, county of Chautauqua, and State of New York, have invented new and useful Improvements in Loom-Shuttles, of which the following, taken in connection with the accompanying drawings, is a full, clear, and exact description.

The invention relates to loom shuttles for weaving textile and other fabrics; and the object of the invention is to provide certain improvements in the spindle construction whereby the operation and manipulation of the spindle and bobbin is greatly simplified and whereby the spindle is held firmly in position, so that it is not liable to work loose, and whereby also it cannot be returned to place when not in the locking position.

In the drawings, Figure 1 is a sectional view of the main working portions of the shuttle with the spindle in the lowered or normal working position. Fig. 2 is a plan view of the shuttle with the tension spring removed and the spindle not turned into the locking position, and accordingly not returnable to its normal position in the shuttle. Fig. 3 is a sectional view of the working parts of the shuttle with the spindle in the raised position. Fig. 4 is a side elevation of the spindle without the spindle head. Fig. 5 is a side elevation of the spindle head with the butt of the spindle therein, the main portion being broken away. Fig. 6 is an end elevation of the spindle head showing the bayonet slot. Fig. 7 is a crosswise sectional view of the shuttle body with the spindle in the raised position.

Similar numerals refer to corresponding parts in the several views.

The numeral 10 indicates the shuttle body which is of the ordinary type with tipped pointed ends and a lengthwise body slot 11 within which the spindle is mounted. The spindle shown in the present construction is of the socket spindle type and consists of two separable parts, the body 12 (which enters the bobbin) and the socket or head 22 which receives the end 15 of the body in an opening 14 therein, the spindle body 12 having an enlargement 13 which sets into a slight enlargement in the end of the opening 14, forming a socket therefor, which firmly holds it in place. Spindle end 15 has pin or projection 16 thereon at a spaced distance from enlargement 13 which distance corresponds to the length of head 22 through hole 14. A slot 17, usually termed a bayonet slot, is provided in opening 14 for pin 16. A portion 27 of the rear end of head 22 is formed so as to incline away from the end of slot 17, so that about a quarter turn of the spindle body 12 locks the spindle end 15 fast in head 22, the pin 16 holding firmly against the bevel 27 when turned to place. The opposite side 28 of slot 17 from the beveled or inclined side 27 is given an abrupt enlargement which prevents pin 16 from turning in the opposite direction from bevel 27 so that the weaver must invariably turn it to the right to lock the spindle and to the left to unlock it.

The spindle head 22 is pivotally mounted in the shuttle body 10 by means of suitable pin 23 at the exact point which will balance the spindle and head. The rear end 18 of spindle body 12 is beveled and a corresponding incline 19 is provided in shuttle body 10 against which the bevel end 15 strikes when the spindle is returned to its normal working position and the spindle body 12 is turned to its locking position in head 22. It is obvious that the spindle body 12 with the bobbin thereon cannot come down to its normal working position as shown in Fig. 1 if the beveled end 18 is not turned to the locking position on rear end 27, since if turned sidewise the rear end 18 would strike against bevel portion 19 which would not allow the spindle and spindle head to come down into their normal place, but would pitch up slightly above the shuttle body 10, so that the weaver must always turn it to its locking position and hence lock it absolutely firm in the spindle head and shuttle body before he can use the loaded shuttle. The lower side of said rear end 18 is left straight and an inclined portion 20 of the closure 21 of the body slot 11 beneath spindle head 22 is provided, against which the straight side of end 18 strikes and forms a limiting brake for the spindle when raised. The upper side of the closure 21 also forms an additional stop and support for the under side of spindle 22 when it is returned to its normal working position and end 18 strikes against bevel 19, the object being to hold the head 22 as firmly as possible so that there can be no yielding of any of these parts. The throw of the shuttle is so swift and powerful that any resiliency or yielding of the parts of the spindle causes it to work loose in a short time and destroy its usefulness.

The upper side of head 22 has a slight projection thereon over which tension spring 25 works as it is held in place by shuttle screw 26, holding the head 22 in the raised or lowered position and causing it to snap to place in the usual manner.

It is apparent that the end 15 of spindle body 12 may be inserted through the bobbin and then inserted through opening 14 in head 22, pin 16 passing through slot 17 and that a slight turn of the spindle locks the same firmly in position in the spindle head and that the spindle cannot be returned to its normal position unless this locking operation is accomplished; it therefore prevents the weaver from using a loose bobbin, and holds the spindle so firmly that long life is given to the shuttle.

I claim as new:—

1. The combination of a shuttle body, a spindle pivoted therein, said spindle composed of a spindle body and spindle head, said head having a hole and bayonet slot therein to receive the end of said spindle body, and a projection on said spindle body to lock on said slotted head, substantially as and for the purpose specified.

2. The combination of a shuttle body, a spindle pivoted therein, said spindle composed of a shuttle body and spindle head, said head having a hole with a bayonet slot therein, the rear end of said head formed at an increasing angle from the end of said slot, and a locking projection near the end of said spindle body to lock with a turn on said rear end.

3. The combination of a shuttle body, a spindle pivotally mounted therein, said spindle composed of a spindle body and spindle head, said head having an opening and locking means for said spindle body, the end of said spindle body extended beyond said head and engaging a similar shaped portion of said shuttle body when in normal working position, and a portion of said shuttle body to stop said spindle end when the spindle is raised, substantially as and for the purpose specified.

4. The combination of a shuttle body 10 having a lengthwise slot 11 therein, a spindle composed of spindle body 12 and head 22 pivotally mounted in said slot, a tension spring 25 for said head, said head having a hole 14 with slot 17 therein and an inclined rear end 27, an enlargement 13 on spindle body 12 and a pin 16 at a spaced distance therefrom to lock on said bevel ended spindle head, and inclines 19 and 20 on said shuttle body to receive end 18 of said spindle body, substantially as and for the purpose specified.

In testimony whereof I have signed my name to this specification in the presence of two subscribing witnesses.

JOHN VARLEY.

Witnesses:
 A. W. KETTLE,
 I. A. ELSWORTH.